(12) United States Patent
Takezawa et al.

(10) Patent No.: US 10,428,943 B2
(45) Date of Patent: Oct. 1, 2019

(54) SIDE RAIL

(71) Applicant: KABUSHIKI KAISHA RIKEN, Chiyoda-ku, Tokyo (JP)

(72) Inventors: Yuichiro Takezawa, Tokyo (JP); Tatsuya Miyajima, Tokyo (JP)

(73) Assignee: KABUSHIKI KAISHA RIKEN, Chiyoda-ku, Tokyo (JP)

( * ) Notice: Subject to any disclaimer, the term of this patent is extended or adjusted under 35 U.S.C. 154(b) by 0 days.

(21) Appl. No.: 15/551,673

(22) PCT Filed: Mar. 3, 2016

(86) PCT No.: PCT/JP2016/001176
§ 371 (c)(1),
(2) Date: Aug. 17, 2017

(87) PCT Pub. No.: WO2016/143315
PCT Pub. Date: Sep. 15, 2016

(65) Prior Publication Data
US 2018/0031127 A1 Feb. 1, 2018

(30) Foreign Application Priority Data

Mar. 12, 2015 (JP) .................................. 2015-049570

(51) Int. Cl.
*F16J 9/06* (2006.01)
*F16J 9/20* (2006.01)
(Continued)

(52) U.S. Cl.
CPC ................. *F16J 9/06* (2013.01); *F16J 9/064* (2013.01); *F16J 9/068* (2013.01); *F16J 9/20* (2013.01);
(Continued)

(58) Field of Classification Search
CPC ...... F16J 9/064; F16J 9/20; F16J 9/203; F16J 9/206
See application file for complete search history.

(56) References Cited

U.S. PATENT DOCUMENTS 2,213,452 A * 9/1940 Paton ....................... F16J 9/063
277/457
2,303,798 A * 12/1942 Solenberger ............. F16J 9/067
277/478
(Continued)

FOREIGN PATENT DOCUMENTS

CN 100491898 C 5/2009
CN 101680545 A 3/2010
(Continued)

OTHER PUBLICATIONS

Sep. 12, 2017, International Preliminary Report on Patentability issued in the International Patent Application No. PCT/JP2016/001176.

(Continued)

*Primary Examiner* — Nicholas L Foster
(74) *Attorney, Agent, or Firm* — Kenja IP Law PC

(57) ABSTRACT

A side rail (1) is formed in a sprit ring shape with an opening (10) and to be mounted on a space expander (2) in an annular shape to constitute, together with the space expander (2), a multi-piece oil ring (3) used in an internal combustion engine. The side rail (1) includes an outer peripheral surface (14) facing radially outward, an inner peripheral surface (13) facing radially inward, a first axial surface (11) facing a crankcase, a second axial surface (12) facing a combustion chamber and parallel to the first axial surface (11), and a protrusion (20) formed on the outer peripheral surface (14) in a position offset from an intermediate position between the first axial surface (11) and the second axial surface (12)

(Continued)

toward the first axial surface (11) and protruding radially outward from the outer peripheral surface (14).

13 Claims, 6 Drawing Sheets

(51) Int. Cl.
*F02F 5/00* (2006.01)
*F16J 9/26* (2006.01)

(52) U.S. Cl.
CPC .............. *F16J 9/203* (2013.01); *F16J 9/26* (2013.01); *F02F 5/00* (2013.01)

(56) References Cited

U.S. PATENT DOCUMENTS

| | | | |
|---|---|---|---|
| 4,235,447 A | | 11/1980 | Davison, Jr. |
| 9,067,286 B2* | | 6/2015 | Lopez ...................... F16J 9/206 |
| 9,851,006 B2* | | 12/2017 | Watanabe ................. F16J 9/20 |
| 10,030,772 B2* | | 7/2018 | Chiba ....................... F16J 9/062 |
| 2012/0261886 A1* | | 10/2012 | Chiba ....................... F16J 9/206 |
| | | | 277/443 |
| 2018/0023702 A1* | | 1/2018 | Nakamura ................ F02F 5/00 |
| | | | 277/434 |

FOREIGN PATENT DOCUMENTS

| | | |
|---|---|---|
| CN | 102639852 A | 8/2012 |
| DE | 102009036240 A1 | 2/2011 |
| FR | 2723401 A1 | 2/1996 |
| JP | S58149547 U | 10/1983 |
| JP | 2002323133 A | 11/2002 |
| JP | 2003194222 A | 7/2003 |
| JP | 2003520931 A | 7/2003 |
| JP | 2009091927 A | 4/2009 |
| JP | 2010530045 A | 9/2010 |
| JP | 2014035038 A | 2/2014 |
| JP | 5463364 B2 | 4/2014 |
| WO | 2005024277 A1 | 3/2005 |

OTHER PUBLICATIONS

Apr. 12, 2016, International Search Report issued in the International Patent Application No. PCT/JP2016/001176.
Jul. 24, 2018, Notification of Reasons for Refusal issued by the Japan Patent Office in the corresponding Japanese Patent Application No. 2015-049570.
May 30, 2018, Office Action issued by the State Intellectual Property Office in the corresponding Chinese Patent Application No. 201680012852.X.
Oct. 11, 2018, the Extended European Search Report issued by the European Patent Office in the corresponding European Patent Application No. 16761290.2.
Jan. 25, 2019, Office Action issued by the State Intellectual Property Office in the corresponding Chinese Patent Application No. 201680012852.X.
Mar. 5, 2019, Notification of Reasons for Refusal issued by the Japan Patent Office in the corresponding Japanese Patent Application No. 2015-049570.
Jul. 11, 2019, Office Action issued by the China National Intellectual Property Administration in the corresponding Chinese Patent Application No. 201680012852.X.

* cited by examiner

SIDE RAIL

TECHNICAL FIELD

This disclosure relates to a side rail to be mounted on a space expander in an annular shape and to constitute, together with the space expander, a multi-piece oil ring used in an internal combustion engine.

BACKGROUND

In addition to a compression ring configured to keep combustion gas out, an oil ring configured to control oil on a cylinder inner surface is mounted on a piston of a reciprocating engine (an internal combustion engine). As such an oil ring, a multi-piece oil ring in which one or a pair of side rails are attached to a space expander in an annular shape has been popularly used.

The side rail used in the multi-piece oil ring is formed in a split ring shape with an opening such that, when pushed by the space expander, the side rail extends its diameter and its outer peripheral surface contacts with the cylinder inner surface applying a predetermined contact pressure (a predetermined surface pressure). When the piston reciprocates during running of the engine, the outer peripheral surface of the side rail slides on the cylinder inner surface, forming an oil film with an appropriate thickness on the cylinder inner surface and scraping off excess oil adhered to the cylinder inner surface toward a crankcase to prevent the oil from climbing up to a combustion chamber.

In recent years, following an improvement in functionality of the internal combustion engine to meet a market demand for low fuel consumption and low oil consumption, there has been a demand for a multi-piece oil ring capable of controlling an oil scraping-up action during piston upstroke (compression stroke and exhaust stroke) and amplifying an oil scraping-off action during piston downstroke (intake stroke and combustion stroke) and thus reducing friction against the cylinder inner surface as well as the oil consumption. In an effort to meet such a demand, there are proposed side rails having outer peripheral surfaces facing radially outward and formed in various shapes.

For example, patent literature PLT 1 set forth below describes a side rail having an outer peripheral surface facing radially outward formed in a curved surface having a vertex at its axial center and protruding radially outward.

CITATION LIST

Patent Literature

PLT 1: JP-A-2003-194222

SUMMARY

Technical Problem

Conventional side rails as described above each have an outer peripheral surface formed in a curved surface with a large radius to slide on an oil film formed on the cylinder inner surface, and thus may reduce friction between the outer peripheral surface and the cylinder inner surface. However, these side rails possibly fail to scrape the oil off sufficiently, causing an increase in oil consumption.

As a countermeasure, the outer peripheral surface of the side rail may be formed in a curved surface with a small radius to reduce its area to contact with the cylinder inner surface. This configuration would enhance an oil scraping-off action of the side rail, reducing the oil consumption.

However, this configuration increases the surface pressure applied to the cylinder inner surface by the outer peripheral surface of the side rail, increasing the friction between the outer peripheral surface and the cylinder inner surface and deteriorating fuel consumption of the engine that uses the multi-piece oil ring.

Therefore, it could be helpful to provide a side rail capable of reducing the oil consumption and the fuel consumption of the engine.

Solution to Problem

A side rail of the disclosure is formed in a split ring shape with an opening and to be mounted on a space expander in an annular shape to constitute, together with the space expander, a multi-piece oil ring used in an internal combustion engine. The side rail includes: an outer peripheral surface facing radially outward; an inner peripheral surface facing radially inward; a first axial surface facing a crankcase; a second axial surface facing a combustion chamber and parallel to the first axial surface; and a protrusion formed on the outer peripheral surface in a position offset from an intermediate position between the first axial surface and the second axial surface toward the first axial surface and protruding radially outward from the outer peripheral surface.

In the above configuration, the "split ring shape with an opening" refers to the side rail formed in a C-shape having a cutout formed on a circumference of the side rail.

In the above configuration, preferably, the protrusion is formed at an end of the outer peripheral surface adjacent to the first axial surface.

In the above configuration, preferably, a tapered portion is formed between the second axial surface and the outer peripheral surface.

In the above configuration, preferably, a sliding surface of the protrusion is formed in a semi-barrel shape.

In the above configuration, preferably, the sliding surface of the protrusion is formed in a cylindrical surface parallel to an axial direction.

In the above configuration, preferably, the outer peripheral surface is formed in a tapered surface with a linearly decreasing diameter.

In the above configuration, preferably, the outer peripheral surface is formed in a surface having a convex curve in a radially outward direction.

In the above configuration, preferably, the outer peripheral surface is formed in a corrugated surface with ridges and grooves alternately arranged.

In the above configuration, preferably, the protrusion is formed in a curved shape with a radius of curvature of 0.05 mm to 0.5 mm, and a radial protrusion height of the protrusion from its portion joined to the outer peripheral surface is at least 0.01 mm.

In the above configuration, preferably, the tapered portion is inclined at an angle of 5 degrees or more with respect to an axial direction.

In the above configuration, preferably, the outer peripheral surface is inclined at an angle of 0.5 degrees to 10 degrees with respect to an axial direction.

In the above configuration, preferably, the protrusion is coated with at least one hard layer selected from the group consisting of, for example, a nitrided layer, a PVD-processed layer, a hard-chromium plated layer, and a DLC layer.

Advantageous Effect

According to the disclosure herein, the side rail has the protrusion to contact with the cylinder inner surface applying a high surface pressure. Therefore, an oil scraping-off action is enhanced during piston downstroke. Also, the protrusion is positioned offset from an axial center of the outer peripheral surface of the side rail toward the first axial surface. This configuration, when the outer peripheral surface of the side rail is pushed against the cylinder inner surface by the mounting plane of the space expander, facilitates upward inclination (inclination in a direction toward the second axial surface) of an inner circumference of the side rail with the protrusion serving as a fulcrum. Thereby, the inner circumference of the side rail reliably contacts with an upper surface of the ring groove of the piston, improving the sealing property. This effect may be exerted particularly during the upstroke of the piston, i.e., the multi-piece oil ring sits on a lower surface of the ring groove of the piston for a long period of time. Also, this effect prevents the oil of the engine using the side rail as described above from climbing up to the combustion chamber and reduces the oil consumption of the engine. Further, the protrusion of the side rail contacts with the cylinder inner surface with a contact width smaller than an axial thickness (a rail width) of the side rail, reducing tension applied to the side rail by the space expander and, simultaneously, preventing a reduction in the surface pressure applied to the cylinder inner surface by the side rail. Accordingly, reduced tension is applied to the side rail, and the friction of the cylinder inner surface caused by the protrusion may be further reduced.

According to the disclosure herein, as described above, a side rail capable of reducing oil consumption and fuel consumption of the engine may be provided.

DETAILED DESCRIPTION

Hereinafter, the disclosure will be described in detail by using an embodiment with reference to the accompanying drawings.

Figure 1:
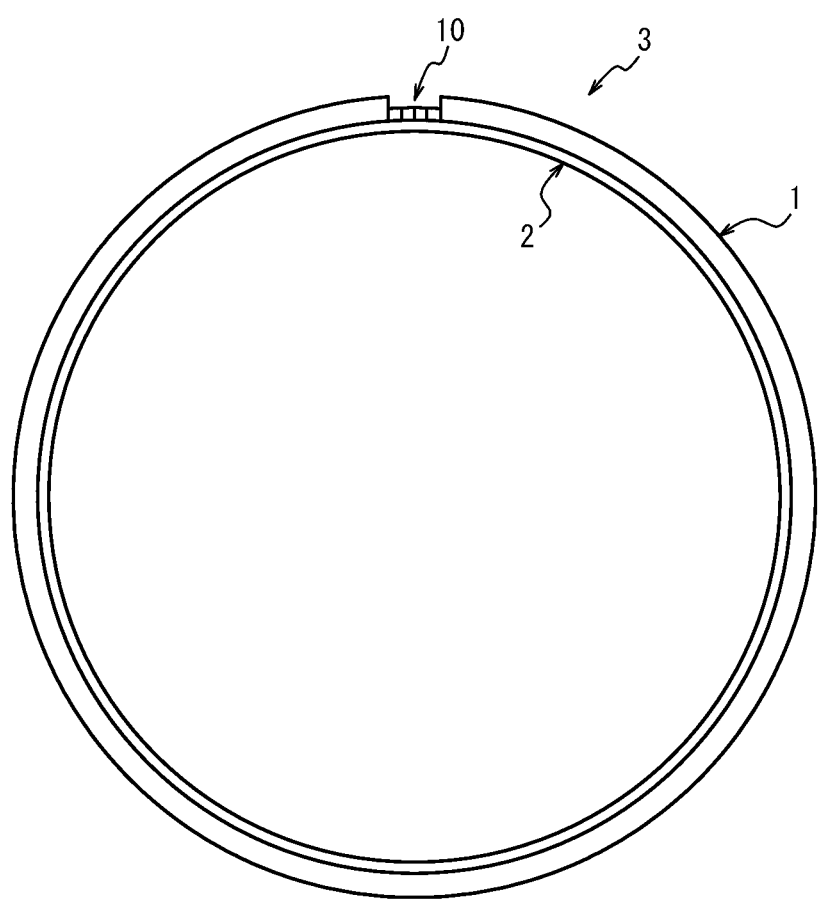
FIG. 1 is a plan view of a multi-piece oil ring that includes a side rail according to one embodiment.
Figure 2:
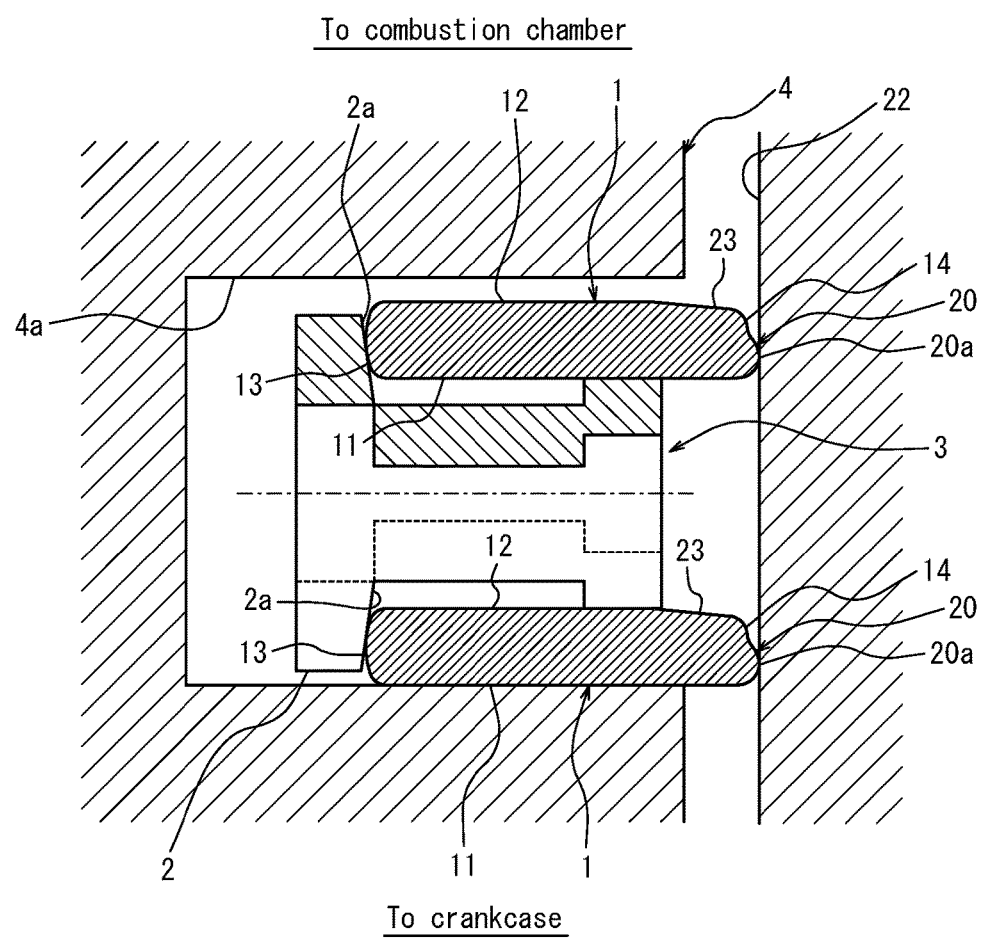
FIG. 2 is a longitudinal cross-sectional view of the multi-piece oil ring illustrated in FIG. 1 in use.

As illustrated in FIG. 1, a side rail 1 according to one embodiment, together with a space expander 2, constitutes a multi-piece oil ring (an oil-controlling ring) 3. In the figure, the multi-piece oil ring 3 is a three-piece oil ring made up of a pair of side rails 1 mounted on either axial side of the space expander 2. As illustrated in FIG. 2, the multi-piece oil ring 3 is placed in a ring groove 4a formed on a peripheral surface of a piston 4 in, for example, a reciprocating combustion engine that runs on petrol.

Alternatively, the multi-piece oil ring 3 may be a two-piece oil ring made up of one space expander 2 and one side rail 1.

The space expander 2 is made of steel and formed in an annular shape and elastically deformable radially inward and outward. The space expander 2, in a state being elastically deformed in a direction to reduce its diameter, is placed in the ring groove 4a of the piston 4 in such a manner as to push the side rail 1 radially outward and axially outward to expand the side rail 1.

Figure 3:
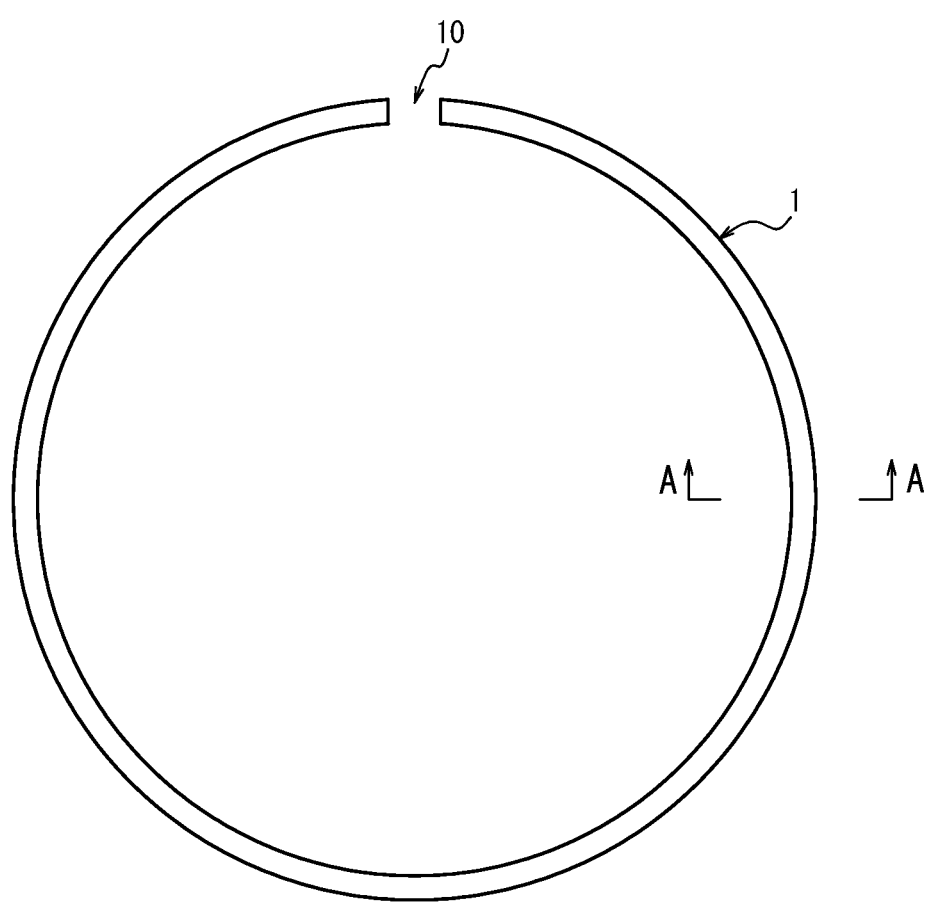
FIG. 3 is a plan view of the side rail illustrated in FIG. 1.

According to the present embodiment, the pair of side rails 1 have identical configurations and, as illustrated in FIG. 3, are each made with a planar steel belt curved to form a split ring shape with an opening 10. That is, the side rail 1 has a C-shape with the opening 10 formed as a cutout at a periphery of the side rail 1. The side rail 1 may be elastically deformed extending the opening 10 in a circumferential direction to extend a diameter of the side rail 1 itself radially outward.

Figure 4:
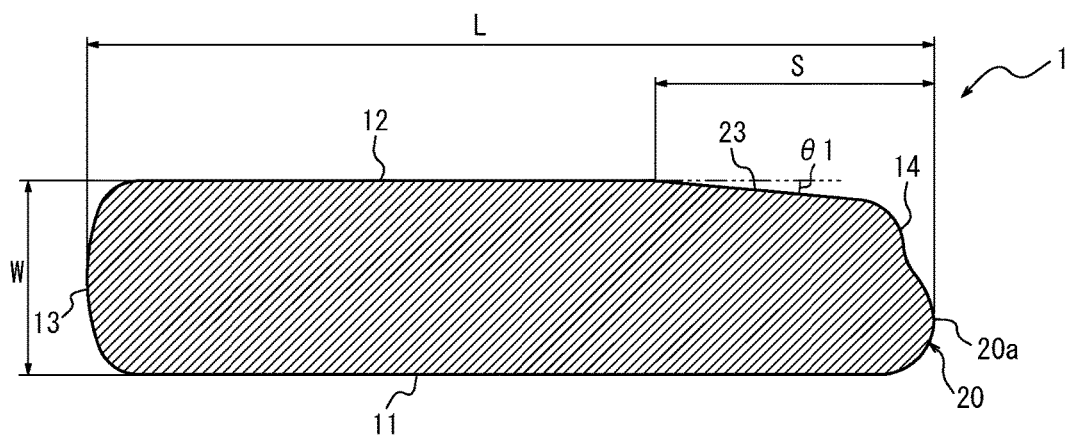
FIG. 4 is a cross-sectional view taken from line A-A of FIG. 3.

As illustrated in FIG. 4, the side rail 1 includes a first axial surface 11 facing one end of an axial direction (a downward direction in the figure), a second axial surface 12 facing the other end of the axial direction (an upward direction in the figure), an inner peripheral surface 13 facing radially inward, and an outer peripheral surface 14 facing radially outward. A cross-sectional shape of the side rail 1 perpendicular to its circumferential direction is approximately the same throughout the circumferential direction. Note that the "axial direction" refers to a direction along an axial direction of the side rail 1 having the split ring shape.

The first axial surface 11 is formed in a planar surface perpendicular to the axial direction. As illustrated in FIG. 2, the first axial surface 11 is facing a crankcase of the engine in a state where the multi-piece oil ring 3 including the side rail 1 is mounted on the piston 4.

As illustrated in FIG. 4, the second axial surface 12 is formed in a planar surface perpendicular to the axial direction, i.e., parallel to the first axial surface 11. As illustrated in FIG. 2, the second axial surface 12 is facing a combustion chamber of the engine in a state where the multi-piece oil ring 3 including the side rail 1 is mounted on the piston 4.

In the figure, an axial distance between the first axial surface 11 and the second axial surface 12 of the side rail 1, i.e., an axial thickness (a rail width) W of the side rail 1 is 0.35 mm. Also, a distance between the inner peripheral surface 13 and the outer peripheral surface 14, i.e., a radial length L of the side rail 1 is 1.52 mm.

As illustrated in FIG. 4, the inner peripheral surface 13 of the side rail 1 is formed in a curved surface (a barrel face) having a vertex at an axial center of the inner peripheral surface 13. Either axial end of the inner peripheral surface 13, i.e., portions of the inner peripheral surface 13 adjacent to the first axial surface 11 or the second axial surface 12 are each beveled to form a curved surface with a small radius. As illustrated in FIG. 2, the inner peripheral surface 13 of the side rail 1 contacts with a mounting plane 2a of the space expander 2 in a state where the multi-piece oil ring 3 including the side rail 1 is mounted on the piston 4.

Note that the inner peripheral surface 13 is not limited to have the above shape but may have various shapes including a cylindrical surface parallel to the axial direction.

Figure 5:
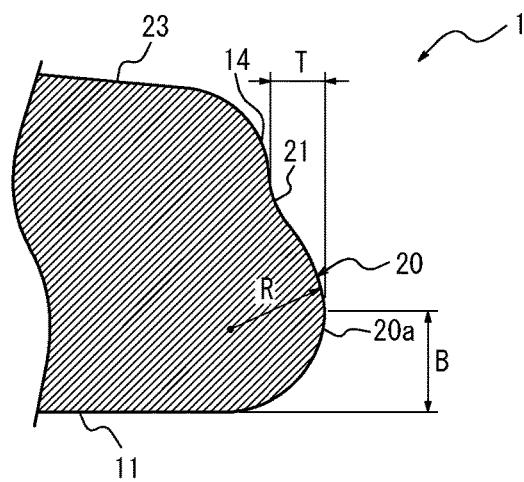
FIG. 5 is an enlarged cross-sectional view of a radially outside portion of the side rail illustrated in FIG. 4.

As illustrated in FIG. 5, the outer peripheral surface 14 of the side rail 1 is formed in a convexly curved surface protruding in a radially outward direction. As illustrated in the figure, also, the outer peripheral surface 14 has an outer diameter gradually reducing in an upward direction in FIG. 5, i.e., from the first axial surface 11 toward the second axial surface 12.

The outer peripheral surface 14 includes a protrusion positioned offset from an intermediate position between the first axial surface 11 and the second axial surface 12 toward the first axial surface 11. The protrusion 20 protrudes radially outward from the outer peripheral surface 14. In the present embodiment, the protrusion 20 is formed at an end of the outer peripheral surface 14 adjacent to the first axial surface 11. The protrusion 20 includes one axial end smoothly joined to the first axial surface 11 and the other axial end smoothly joined to the outer peripheral surface 14 via a concave portion 21.

A vertex of the protrusion 20 in a semi-barrel shape serves as the sliding surface 20a. As illustrated in FIG. 2, the side rail 1 contacts with the cylinder inner surface 22 at the sliding surface 20a. That is, the side rail 1, at the position offset from the axial center thereof toward the first axial surface 11, contacts with the cylinder inner surface 22.

Note that, depending on an inclination state of the side rail 1 when the engine is running and a wear degree of the protrusion 20, the outer peripheral surface 14 in addition to the protrusion 20 may slide on the cylinder inner surface 22.

Figure 6:
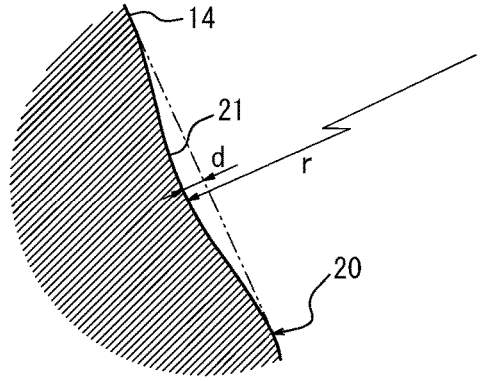
FIG. 6 is an enlarged cross-sectional view of a concave portion illustrated in FIG. 5.
Figure 7:
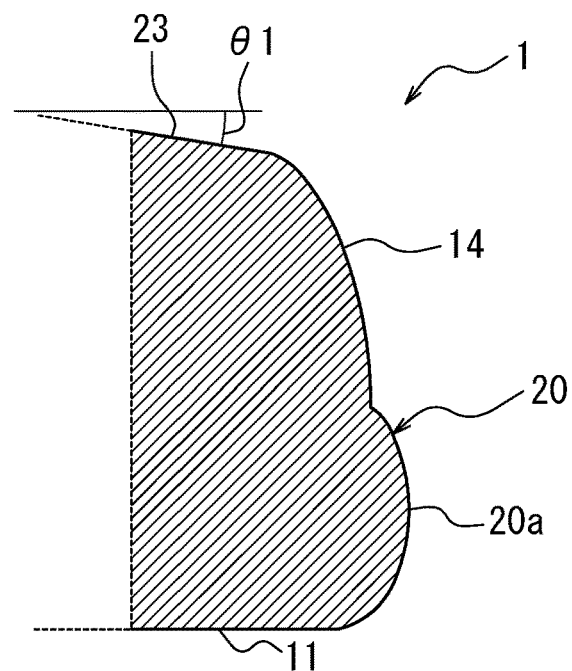
FIG. 7 is an enlarged cross-sectional view of a variation of the side rail illustrated in FIG. 5 having no concave portion between an outer peripheral surface and the protrusion.

As illustrated in FIG. 6, the concave portion 21 formed between the outer peripheral surface 14 and the protrusion 20 functions as an oil pocket for holding the oil. In this case, the concave portion 21 is preferably formed in a concave surface with a radius of curvature r of at least 0.06 mm and a depth d of at least 0.005 mm. As illustrated in FIG. 7, alternatively, the side rail 1 may omit the concave portion 21 formed between the outer peripheral surface 14 and the protrusion 20.

As described above, the side rail 1 of the disclosure includes the outer peripheral surface 14 having the protrusion 20 that is positioned offset from the axial center of the outer peripheral surface 14 toward one axial end of the outer peripheral surface 14 and slides on the cylinder inner surface 22. This configuration reduces an actual width of the protrusion 20 to contact with the cylinder inner surface 22 and thus allows the protrusion 20 to contact with the cylinder inner surface 22 applying a high surface pressure. During the piston downstroke, consequently, an oil scraping-off action of the side rail 1 may be enhanced, preventing the oil from climbing up to the combustion chamber of the engine using the side rail 1, i.e., reducing the oil consumption of the engine.

During the piston upstroke, the outer peripheral surface 14 of the side rail 1 forms an optimum oil film between the outer peripheral surface 14 and the cylinder inner surface 22, allowing the protrusion 20 to slide on this oil film formed on the cylinder inner surface 22. This configuration, during the piston upstroke, prevents the side rail 1 from scraping the oil up. Consequently, the oil is prevented from climbing up to the combustion chamber of the engine using the side rail 1, reducing the oil consumption of the engine.

During the piston upstroke, further, the outer peripheral surface 14 of the side rail 1 forms the optimum oil film between the outer peripheral surface 14 and the cylinder inner surface 22, allowing the protrusion 20 to slide on this oil film formed on the cylinder inner surface 22, as described above. This configuration reduces the friction against the cylinder inner surface 22 caused by the protrusion 20 and also reduces the fuel consumption of the engine using the side rail 1. Also, oil is sufficiently supplied, effectively preventing the wear of the protrusion 20 and reducing the oil consumption and the fuel consumption of the engine for a long period of time.

Further, even when the protrusion 20 is worn away after being used for a long period of time, the outer peripheral surface 14 adjacent to the protrusion 20 causes a wedge effect between the outer peripheral surface 14 and the cylinder inner surface 22. Consequently, the side rail 1 may maintain an oil-scraping effect for a long period of time, reducing the oil consumption and the fuel consumption of the engine.

As described above, the side rail 1 of the disclosure reduces the oil consumption and the fuel consumption of the engine using the side rail 1. As compared with, for example, a side rail having a vertex of a sliding surface in an axial center of an outer peripheral surface, the side rail 1 of the disclosure may reduce the oil consumption of the engine by 50% or more and, on condition that these side rails have the same tension, the friction by 20%.

In the present embodiment, further, the outer peripheral surface 14 adjacent to the protrusion 20 is formed in a shape with a diameter gradually reducing toward the second axial surface 12. This configuration enables, during the piston upstroke, effective formation of the oil film between the outer peripheral surface 14 and the cylinder inner surface 22.

A position of the vertex of the protrusion 20 in the axial direction from the first axial surface 11, i.e., an axial distance B (see FIG. 5) between the first axial surface 11 and the vertex of the protrusion 20 is preferably within a range of 30% or less of the axial thickness (the rail width) W of the side rail 1. In the figure, the axial distance B is 0.1 mm, i.e., approximately 28.6% of the axial thickness W of the side rail 1. This configuration enhances the foregoing effect of the protrusion 20.

A radius of curvature R of the protrusion 20 formed in the curved surface (see FIG. 5) is preferably within a range of 0.05 mm to 0.15 mm. In the figure, the radius of curvature R of the protrusion 20 is 0.1 mm. This configuration enhances the foregoing effects of the protrusion 20.

A maximum value of the radius of curvature R of the protrusion 20 is preferably 43% or less of the axial thickness W of the side rail 1. For example, when the axial thickness W of the side rail 1 is 0.35 mm, the maximum value of the radius of curvature R of the protrusion 20 is 0.15 mm or less.

A radial protrusion height T (see FIG. 5) of the protrusion 20 from its connection portion joined to the outer peripheral surface 14 is preferably at least 0.01 mm. In the figure, the radial protrusion height T of the protrusion 20 is 0.054 mm. In the present embodiment, the concave portion 21 is provided between the protrusion 20 and the outer peripheral surface 14, in which case the radial protrusion height T is measured assuming that the protrusion 20 has its connection portion in the same position as the connection portion formed when the concave portion 21 is omitted. The radial protrusion height T of the protrusion 20 set as described above offers an effect of preventing the protrusion 20 from wearing away for a long period of time and an effect of reducing the oil consumption and the fuel consumption of the engine for a long period of time.

As illustrated in FIG. 4, the side rail 1 may also include a tapered portion 23 between the second axial surface 12 and the outer peripheral surface 14. The tapered portion 23, during manufacture of the side rail 1 having a vertically asymmetrical shape in which the outer peripheral surface 14 and the protrusion 20 are formed side by side in the axial direction, or during assembly of the side rail 1 on the ring groove 4a of the piston 4, facilitates the discrimination between a top and a bottom (a front side and a rear side) of the side rail 1. Accordingly, the side rail 1 may be easily produced and prevented from being mounted on the ring groove 4a of the piston 4 to face in a wrong direction.

An angle θ1 (see FIG. 4) of the tapered portion 23 with respect to the second axial surface 12 is preferably at least 5 degrees. In the figure, the angle θ1 is 5 degrees. This configuration makes the tapered portion 23 more apparent and facilitates the discrimination between the top and the bottom of the side rail 1.

Further, the tapered portion 23 preferably has a radial distance S of at least 0.4 mm between a portion joined to the second axial surface 12 and the vertex of the protrusion 20. In the figure, the radial distance S is 0.5 mm. The radial distance S set as described above, when the tapered portion 23 is provided to facilitate the discrimination between the top and the bottom of the side rail 1, minimizes an impact of the tapered portion 23 on an inclining motion of the side rail 1 in the ring groove 4a.

Figure 8:
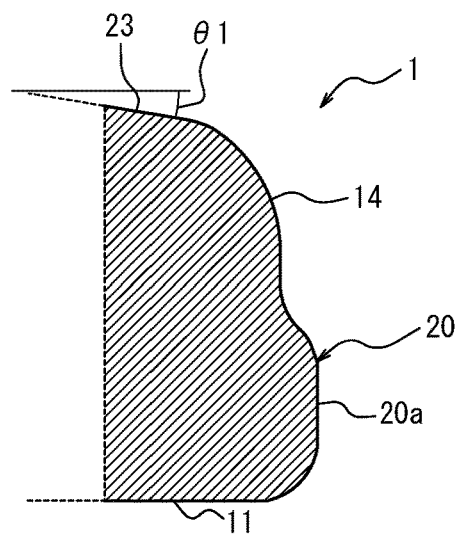
FIG. 8 is an enlarged cross-sectional view of a variation of the side rail illustrated in FIG. 5 in which a sliding surface of the protrusion is formed in a cylindrical surface.

The protrusion 20 is not limited to have the sliding surface 20a in the semi-barrel shape as illustrated in FIGS. 4 and 5 but may have the sliding surface 20a formed in a cylindrical surface parallel to the axial direction. For example, when the protrusion 20 is formed having the sliding surface 20a in the semi-barrel shape and then subjected to lapping, the sliding surface 20a of the protrusion 20 is formed in the cylindrical surface as illustrated in FIG. 8. When the sliding surface 20a of the protrusion 20 is formed in the cylindrical surface, the side rail 1 at an initial using stage thereof may smoothly contact with the cylinder inner surface 22 and, simultaneously, the protrusion 20 may be prevented from wearing away. Consequently, the oil consumption and the fuel consumption of the engine may be reduced for a long period of time.

Although not illustrated in the figure, a surface of the protrusion 20 including the sliding surface 20a may be coated with a hard film (a hard layer). The hard film may contain at least one layer selected from the group consisting of, for example, a nitrided layer, a PVD-processed layer, a hard-chromium plated layer, and a DLC layer.

Note that the "PVD treated layer" refers to "a layer formed by physical vapor deposition (Physical Vapor Deposition)", and the "DLC (Diamond Like Carbon) layer" refers to a noncrystalline hard carbon film mainly composed of hydrocarbon or carbon allotrope.

Being coated with the hard film as described above, the protrusion 20 may be prevented from wearing away due to the friction for a long period of time. Also, the oil consumption and the fuel consumption of the engine may be reduced for a long period of time.

The outer peripheral surface 14 of the side rail 1 may be provided with the hard film similar to the foregoing hard film. Also, at least one of a top surface, a bottom surface, and lateral surfaces of the inner and outer circumferences of the side rail 1 may be treated with metal plating using Ni or Cu for the purpose of antifouling to prevent sludge and the like.

Figure 9:
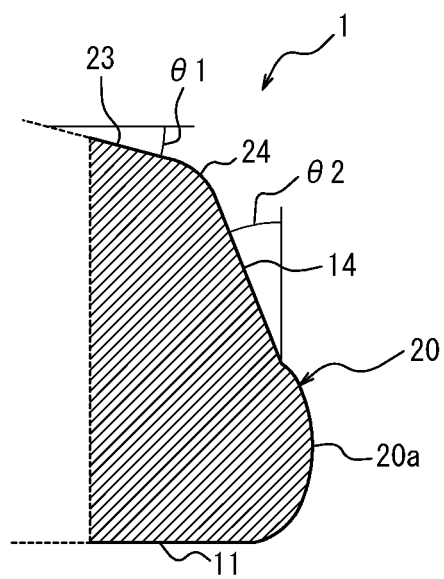
FIG. 9 is an enlarged cross-sectional view of a variation of the side rail illustrated in FIG. 5 in which the outer peripheral surface is formed in a tapered surface with a linearly decreasing diameter.

As illustrated in FIG. 9, the outer peripheral surface 14 may have a tapered portion (a conical surface) with a diameter linearly decreasing from the first axial surface 11 toward the second axial surface 12. This configuration, during the piston upstroke, more effectively prevents the outer peripheral surface 14 from scraping the oil up.

An angle θ2 of the tapered portion with respect to the axial direction of the outer peripheral surface 14 is preferably within a range of 0.5 degrees to 10 degrees. This configuration allows effective generation of the wedge effect between the outer peripheral surface 14 and the cylinder inner surface 22, efficiently supplying the oil between the protrusion 20 and the cylinder inner surface 22.

In an example illustrated in FIG. 9, a portion between the outer peripheral surface 14 and tapered portion 23 may be beveled to form a curved surface 24 with a predetermined radius of curvature.

Figure 10:
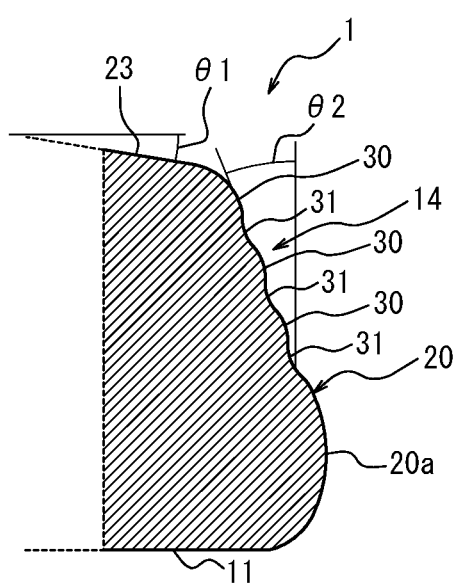
FIG. 10 is an enlarged cross-sectional view of a variation of the side rail illustrated in FIG. 5 in which the outer peripheral surface is formed in a corrugated surface with ridges and grooves alternately arranged.

As illustrated in FIG. 10, the outer peripheral surface 14 may be formed in a corrugated surface with ridges 30 and grooves 31 alternately arranged in the axial direction. These ridges 30 and grooves 31 are preferably formed in curved surfaces, but may be formed otherwise. In the figure, three ridges 30 and three grooves 31 formed in the curved surfaces with the same radii of curvature are alternately arranged.

Note that any number of the ridges 30 and the grooves 31 may be provided, and the ridges 30 and the grooves 31 may have either the same or different radii of curvature. The outer peripheral surface 14 may be formed by a combination of any number of the ridges 30 and the grooves 31 having different shapes and/or different radii of curvature.

In FIG. 10, also, the outer peripheral surface 14 is preferably formed in the corrugated surface with the ridges 30 and the grooves 31 arranged in such a manner that the outer peripheral surface 14 has a diameter gradually reducing from the first axial surface 11 toward the second axial surface 12. An angle θ2 of the corrugated surface with respect to the axial direction is preferably within a range of 0.5 degrees to 10 degrees.

When the outer peripheral surface 14 is formed in the corrugated surface as described above, the ridges 30 constituting the outer peripheral surface 14, together with the protrusion 20, may slide on the cylinder inner surface 22 and scrape the oil off in a manner similar to the protrusion 20, depending on the inclination state of the side rail 1 when the engine is running and the wear degree of the protrusion 20.

It is to be understood that the disclosure herein is not limited to the foregoing embodiment but may be varied in a variety of manners without departing from the spirit and the scope of the disclosure herein.

For example, the outer peripheral surface 14 and the protrusion 20 is not limited to have the foregoing shapes but may have various shapes.

Further, the position of the protrusion 20 is not limited to the end of the outer peripheral surface 14 adjacent to the first axial surface 11 but may be anywhere as long as being offset from the intermediate position between the first axial surface 11 and the second axial surface 12 toward the first axial surface 11.

REFERENCE SIGNS LIST 1 side rail
2 space expander
2a mounting plane
3 multi-piece oil ring
4 piston
4a ring groove
10 opening
11 first axial surface
12 second axial surface
13 inner peripheral surface
14 outer peripheral surface
20 protrusion 20a sliding surface
21 concave portion
22 cylinder inner surface
23 tapered portion
24 curved surface
30 ridge
31 groove
r radius of curvature
d depth
W axial thickness
L radial length
B axial distance
R radius of curvature
T radial protrusion height
S radial distance
θ1 angle
θ2 angle

The invention claimed is:

1. A side rail formed in a split ring shape with an opening and formed to be mounted on a space expander having an annular shape to constitute, together with the space expander, a multi-piece oil ring used in an internal combustion engine, the side rail comprising:
   an outer peripheral surface for facing radially outward;
   an inner peripheral surface for facing radially inward;
   a first axial surface for facing a crankcase;
   a second axial surface for facing a combustion chamber and parallel to the first axial surface; and
   a protrusion formed on the outer peripheral surface in a position offset from a center position between the first axial surface and the second axial surface, formed toward the first axial surface, and formed protruding radially outward from the outer peripheral surface,
   wherein a vertex of the protrusion serves as a sliding surface for contacting with the cylinder inner surface,
   wherein the vertex is provided between the center position and the first axial surface, and is separated from the first axial surface, and
   wherein a curved surface is provided between the vertex and the first axial surface, and the curved surface adjoins the first axial surface.

2. The side rail according to claim 1, wherein the protrusion is formed at an end of the outer peripheral surface adjacent to the first axial surface.

3. The side rail according to claim 1, wherein a tapered portion is formed between the second axial surface and the outer peripheral surface.

4. The side rail according to claim 1, wherein a sliding surface of the protrusion is formed in a semi-barrel shape.

5. The side rail according to claim 1, wherein a sliding surface of the protrusion is formed as a cylindrical surface parallel to an axial direction.

6. The side rail according to claim 1, wherein the outer peripheral surface is formed in a tapered surface with a linearly decreasing diameter.

7. The side rail according to claim 1, wherein the outer peripheral surface is formed in a surface having a convex curve in a radially outward direction.

8. The side rail according to claim 1, wherein the outer peripheral surface is formed in a corrugated surface with ridges and grooves alternately arranged.

9. The side rail according to claim 1,
   wherein the protrusion is formed in a curved shape with a radius of curvature of 0.05 mm to 0.5 mm, and
   wherein a radial protrusion height of the protrusion from a portion joined to the outer peripheral surface is at least 0.01 mm.

10. The side rail according to claim 3, wherein the tapered portion is inclined at an angle of 5 degrees or more with respect to an axial direction.

11. The side rail according to claim 6, wherein the outer peripheral surface is inclined at an angle of 0.5 degrees to 10 degrees with respect to an axial direction.

12. The side rail according to claim 1, wherein the protrusion is coated with at least one hard layer selected from the group consisting of a nitrided layer, a PVD-processed layer, a hard-chromium plated layer, and a DLC layer.

13. The side rail according to claim 8, wherein the outer peripheral surface is inclined at an angle of 0.5 degrees to 10 degrees with respect to an axial direction.

* * * * *